United States Patent
Yamashita et al.

(10) Patent No.: US 12,219,246 B2
(45) Date of Patent: Feb. 4, 2025

(54) ELECTRIC CIRCUIT AND ELECTRONIC APPARATUS

(71) Applicant: CANON KABUSHIKI KAISHA, Tokyo (JP)

(72) Inventors: Nobuaki Yamashita, Kanagawa (JP); Takuya Kondo, Kanagawa (JP); Takashi Numagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 102 days.

(21) Appl. No.: 18/316,253

(22) Filed: May 12, 2023

(65) Prior Publication Data
US 2023/0283890 A1  Sep. 7, 2023

Related U.S. Application Data

(63) Continuation of application No. 17/703,440, filed on Mar. 24, 2022, now Pat. No. 11,689,801.

(30) Foreign Application Priority Data

Apr. 1, 2021 (JP) .................... 2021-062669

(51) Int. Cl.
  *H02M 1/44* (2007.01)
  *H04N 23/65* (2023.01)
(52) U.S. Cl.
  CPC .............. *H04N 23/65* (2023.01); *H02M 1/44* (2013.01)
(58) Field of Classification Search
  None
  See application file for complete search history.

(56) References Cited

U.S. PATENT DOCUMENTS

| 5,844,762 A | 12/1998 | Yamamura |
| 6,353,353 B1 | 3/2002 | Nakayama |
| 7,595,679 B1 | 9/2009 | Popovich |
| 9,084,364 B2 | 7/2015 | Hoshi |

(Continued)

FOREIGN PATENT DOCUMENTS

| JP | H03-084627 U | 8/1991 |
| JP | H06-132668 A | 5/1994 |
| JP | 2001-223449 A | 8/2001 |

OTHER PUBLICATIONS

Japanese Office Action issued Jul. 18, 2023 during prosecution of related Japanese application No. 2021-062669 (English-language machine translation included.).

*Primary Examiner* — Jeffrey S Zweizig
(74) *Attorney, Agent, or Firm* — VENABLE LLP

(57) ABSTRACT

An electric circuit includes a first power-supply line, a second power-supply line, a ground line, a first circuit, a second circuit, an RC series circuit, a capacitor, and a noise filter. The first circuit is configured to be electrically connected to the first power-supply line via a first power-supply terminal and electrically connected to the ground line via a first ground terminal. The second circuit is configured to be electrically connected to the second power-supply line via a second power-supply terminal and electrically connected to the ground line via a second ground terminal. The RC series circuit is disposed between the first power-supply terminal and the first ground terminal. The capacitor is disposed between the second power-supply terminal and the second ground terminal. The noise filter is disposed between the first power-supply line and the second power-supply line.

15 Claims, 9 Drawing Sheets

(56) References Cited

U.S. PATENT DOCUMENTS

| | | |
|---|---|---|
| 9,192,044 B2 | 11/2015 | Hayashi |
| 9,326,370 B2 | 4/2016 | Murai |
| 9,907,155 B2 | 2/2018 | Numagi |
| 10,306,761 B2 | 5/2019 | Numagi |
| 10,716,211 B2 | 7/2020 | Numagi |
| 2020/0393787 A1 | 12/2020 | Numagi |
| 2022/0304144 A1 | 9/2022 | Kondo |

ELECTRIC CIRCUIT AND ELECTRONIC APPARATUS

This application is a continuation of U.S. application Ser. No. 17/703,440 filed Mar. 24, 2022, the contents of which is incorporated by reference herein.

BACKGROUND OF THE INVENTION

Field of the Invention

The present disclosure relates to an electric circuit.

Description of the Related Art

An electronic apparatus includes an electric circuit including a plurality of circuits that can receive or output signals. When each circuit operates, current flows into the circuit through a power supply path in accordance with the operation of the circuit. The impedance of the power supply path is called source impedance. The current that flows through the power supply path and the source impedance cause potential fluctuation, which is expressed as the product of the current and the source impedance. The potential fluctuation is called power-supply potential fluctuation or power supply noise.

For reducing the power supply noise, Japanese Patent Application Publication No. H06-132668 discloses a configuration in which a series circuit constituted by a resistor and a capacitor is connected to each of the plurality of circuits.

However, the power supply noise produced by the operation of one of the plurality of circuits may interfere with another circuit of the plurality of circuits via the power supply path. For this reason, further improvement has been desired for stabilizing the operation of the circuits.

SUMMARY OF THE INVENTION

According to a first aspect of the present invention, an electric circuit includes a first power-supply line, a second power-supply line, a ground line, a first circuit, a second circuit, an RC series circuit, a capacitor, and a noise filter. The first circuit includes a first capacitance component having a first capacitance. The first circuit is configured to be electrically connected to the first power-supply line via a first power-supply terminal and electrically connected to the ground line via a first ground terminal. The second circuit includes a second capacitance component having a second capacitance smaller than the first capacitance. The second circuit is configured to be electrically connected to the second power-supply line via a second power-supply terminal and electrically connected to the ground line via a second ground terminal. The RC series circuit is disposed between the first power-supply terminal and the first ground terminal. The capacitor is disposed between the second power-supply terminal and the second ground terminal. The noise filter is disposed between the first power-supply line and the second power-supply line.

According to a second aspect of the present invention, an electric circuit includes a first power-supply line, a second power-supply line, a ground line, a first circuit, a second circuit, an RC series circuit, a capacitor, and a noise filter. The first circuit includes a first circuit element configured to transmit a first digital signal. The first circuit is configured to be electrically connected to the first power-supply line via a first power-supply terminal and electrically connected to the ground line via a first ground terminal. The second circuit includes a second circuit element configured to transmit a second digital signal whose transmission rate is lower than a transmission rate of the first digital signal. The second circuit is configured to be electrically connected to the second power-supply line via a second power-supply terminal and electrically connected to the ground line via a second ground terminal. The RC series circuit is disposed between the first power-supply terminal and the first ground terminal. The capacitor is disposed between the second power-supply terminal and the second ground terminal. The noise filter is disposed between the first power-supply line and the second power-supply line.

Further features of the present invention will become apparent from the following description of exemplary embodiments with reference to the attached drawings.

DESCRIPTION OF THE EMBODIMENTS

Figure 1:
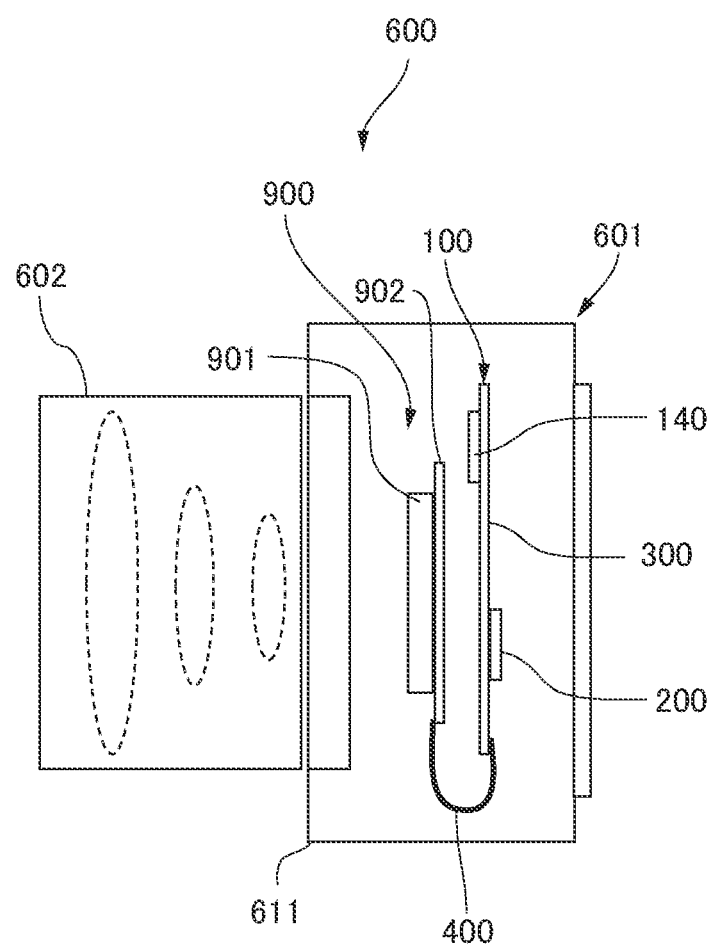
FIG. 1 is a diagram illustrating a digital camera, which is an image pickup device that serves as one example of electronic apparatuses of an embodiment.

Hereinafter, an embodiment of the present invention will be described in detail with reference to the accompanying drawings. FIG. 1 is a diagram illustrating a digital camera 600, which is an image pickup device that serves as one example of electronic apparatuses of the embodiment. The digital camera 600, which is an image pickup apparatus, is a digital camera with interchangeable lenses; and includes a camera body 601. To the camera body 601, a lens unit (lens barrel) 602 including lenses is detachably attached. The camera body 601 includes a housing 611, a processing module 100, and a sensor module 900. The processing module 100 and the sensor module 900 are disposed in the housing 611. The processing module 100 is one example of electronic modules, and is formed as a printed circuit board. The processing module 100 and the sensor module 900 are electrically connected with each other via a cable 400. In the housing 611, a battery (not illustrated) is disposed.

The sensor module 900 includes an image sensor 901 that is an image pickup device, and a printed wiring board 902. The image sensor 901 is mounted on the printed wiring board 902. The image sensor 901 may be a complementary metal oxide semiconductor (CMOS) image sensor or a charge coupled device (CCD) image sensor. The image sensor 901 has a function that converts the light having passed through the lens unit 602, to an electrical signal.

The processing module 100 includes a semiconductor device 200, a power supply device 140, and a printed wiring board 300. The semiconductor device 200 is one example of a first semiconductor device. The power supply device 140 is one example of a second semiconductor device.

The semiconductor device 200 and the power supply device 140 are mounted on the printed wiring board 300. The printed wiring board 300 is a rigid wiring board. The semiconductor device 200 may be a digital signal processor; and has a function that receives an electrical signal from the image sensor 901, corrects the electrical signal, and creates image data. The power supply device 140 supplies electric power from the battery (not illustrated) to components of the digital camera 600, which includes the semiconductor device 200. The power supply device 140 is an IC that includes power supply elements. The power supply device 140 applies a direct-current voltage to the semiconductor device 200 via the printed wiring board 300, and thereby supplies electric power (i.e., power supply current) to the semiconductor device 200 for operating the semiconductor device 200. In the printed wiring board 300, a power supply path is formed for supplying the electric power (i.e., power supply current) from the power supply device 140 to the semiconductor device 200. The power supply path includes a power supply line and a ground line.

Figure 2:
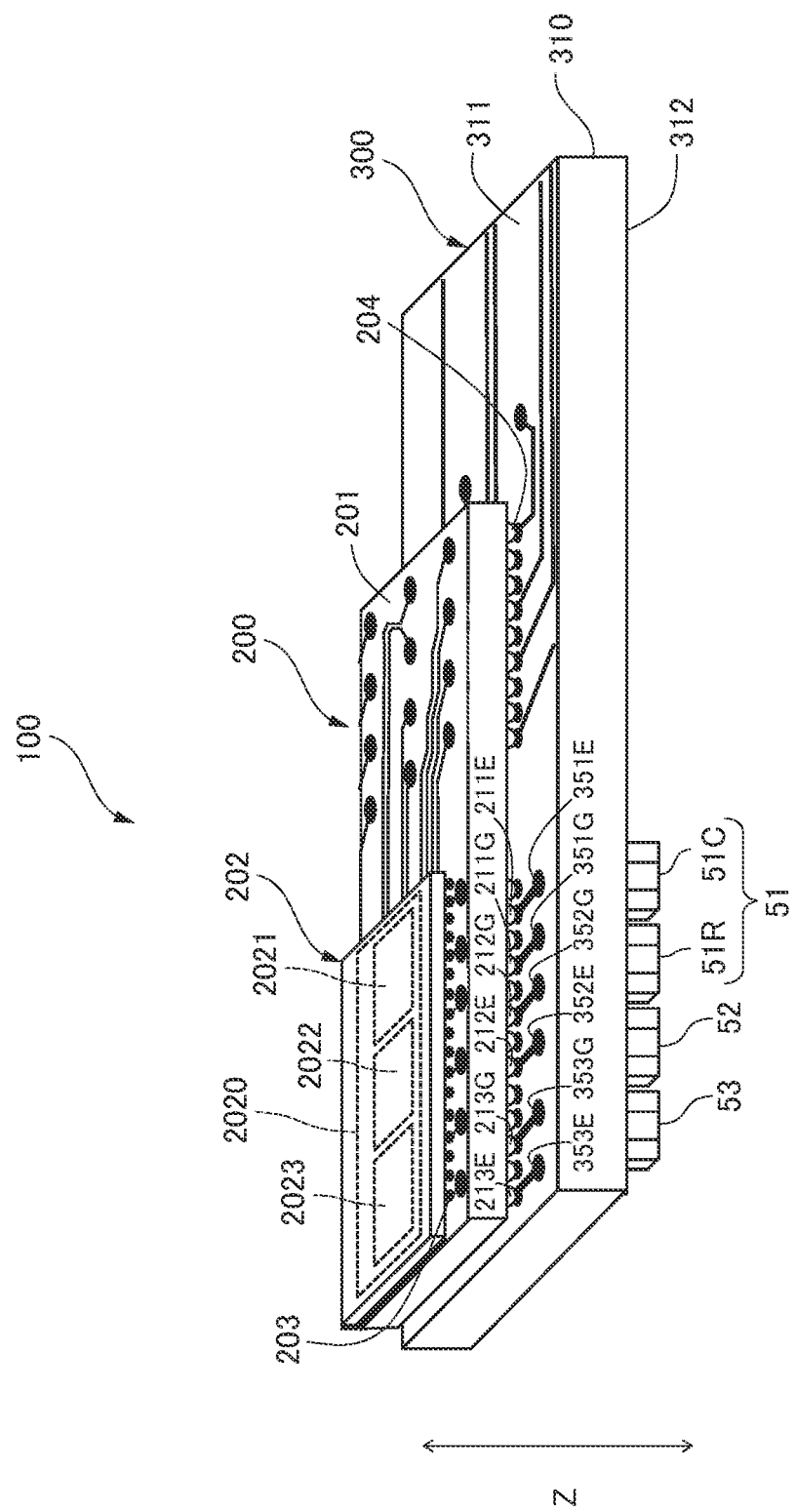
FIG. 2 is a perspective view illustrating one portion of a processing module of the embodiment.

FIG. 2 is a perspective view illustrating one portion of the processing module 100 of the embodiment. The semiconductor device 200 is a semiconductor package. In the present embodiment, the semiconductor device 200 is a ball grid array (BGA) semiconductor package. The semiconductor device 200 includes a package board 201, and a semiconductor element 202 mounted on the package board 201.

The semiconductor element 202 is a semiconductor chip, and includes a die 2020 that is sealed with sealing resin. The die 2020 includes a plurality of core circuits and a plurality of transmitting circuits (buffers). The plurality of core circuits receives a digital signal, and processes the digital signal. The plurality of transmitting circuits transmits a digital signal outputted from the plurality of core circuits, to an external device or another semiconductor device. In the present embodiment, the plurality of transmitting circuits includes a circuit 2021, a circuit 2022, and a circuit 2023. The circuit 2021 is one example of a first circuit. Each of the circuits 2022 and 2023 is one example of a second circuit. That is, the semiconductor element 202 includes at least one first circuit and at least one second circuit. In the present embodiment, the semiconductor element 202 includes the single circuit 2021 and the two circuits 2022 and 2023. Thus, the circuits 2021 to 2023 are included in the single semiconductor device 200. Each of the circuits 2021 to 2023 is a semiconductor integrated circuit. The circuit 2021 is a universal serial bus (USB) transmitting circuit, for example.

The circuits 2022 and 2023 are low voltage complementary metal oxide semiconductor (LVCMOS) transmitting circuits, for example. Each of the circuits 2021 to 2023 is one of the plurality of transmitting circuits. However, each of the circuits 2021 to 2023 may be one of the plurality of core circuits.

The package board 201 is one example of interposers. The semiconductor element 202 is electrically and mechanically connected to the package board 201 via a plurality of solder bumps 203. The semiconductor device 200 has a plurality of terminals 204, which is disposed on a main surface of the package board 201 (the package board 201 has a pair of main surfaces) opposite to a main surface of the package board 201 on which the semiconductor element 202 is mounted. The package board 201 is electrically and mechanically connected to the printed wiring board 300 via the plurality of terminals 204. For example, each of the terminals 204 is a solder ball. The plurality of terminals 204 is disposed like a lattice.

The processing module 100 includes an RC series circuit 51, and a plurality of (e.g., two) capacitors 52 and 53. The RC series circuit 51 and the capacitors 52 and 53 are mounted on the printed wiring board 300. The RC series circuit 51 is disposed, corresponding to the circuit 2021. The capacitor 52 is disposed, corresponding to the circuit 2022. The capacitor 53 is disposed, corresponding to the circuit 2023. The RC series circuit 51 and the capacitors 52 and 53 are disposed on the power supply path for reducing the power-supply potential fluctuation, or the power supply noise, produced by the operation of the semiconductor device 200. The RC series circuit 51 and the capacitors 52 and 53 are each disposed between the power supply line and the ground line of the power supply path. The RC series circuit 51 includes at least one resistor and at least one capacitor. In the present embodiment, the RC series circuit 51 is constituted by a resistor 51R and a capacitor 51C. The resistor 51R and the capacitor 51C are connected in series with each other.

The printed wiring board 300 includes an insulating board 310. The insulating board 310 is formed like a flat board, and includes a pair of main surfaces 311 and 312. The main surface 312 is opposite to the main surface 311. In the present embodiment, the semiconductor device 200 is disposed on the main surface 311 of the insulating board 310 of the printed wiring board 300, and the RC series circuit 51 and the capacitors 52 and 53 are disposed on the main surface 312 of the insulating board 310 of the printed wiring board 300. When viewed in a Z direction, the RC series circuit 51 and the capacitors 52 and 53 are disposed at positions that overlap with the semiconductor device 200. The Z direction is a direction that is perpendicular to the main surfaces 311 and 312.

Figure 3:
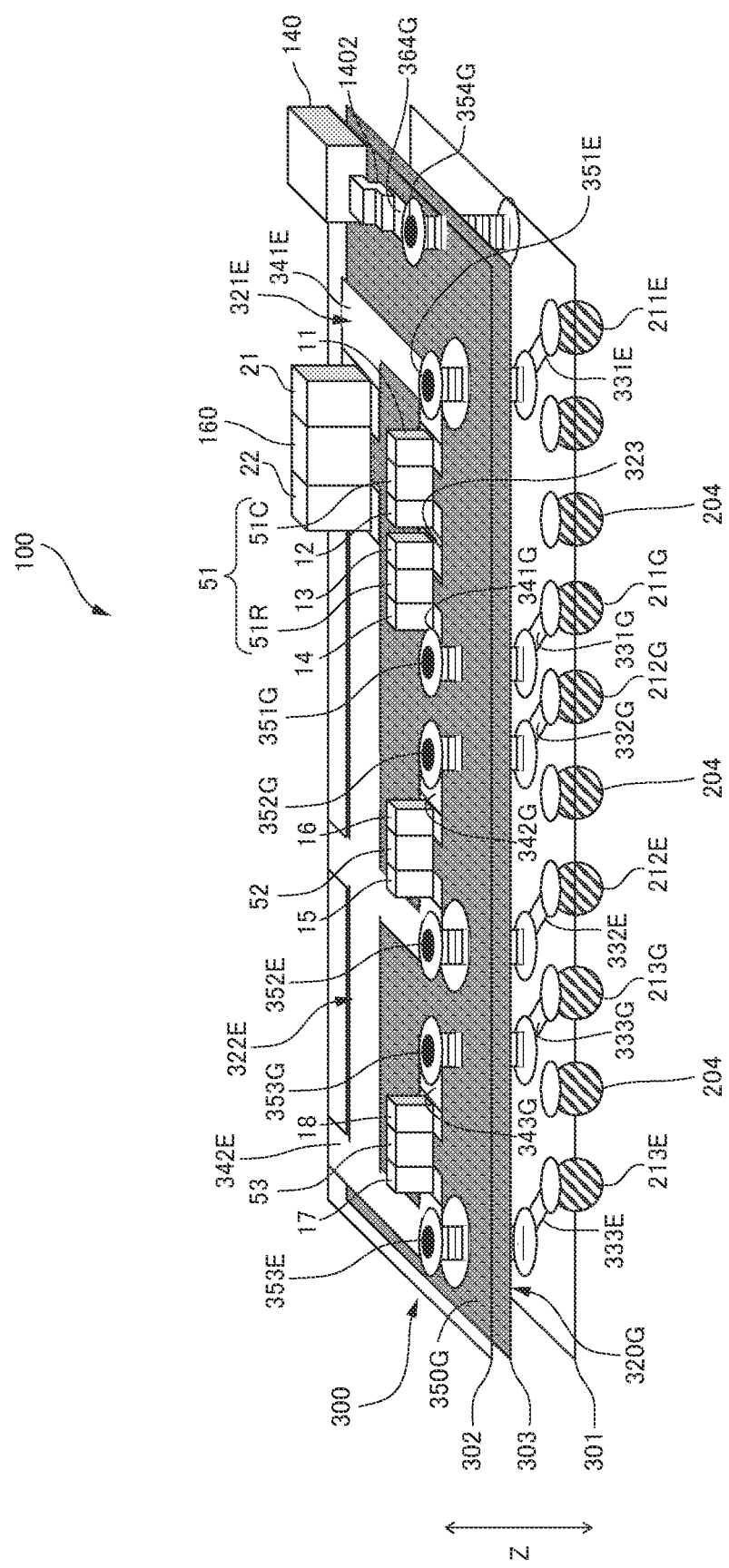
FIG. 3 is a schematic diagram for illustrating a wiring structure of a portion of the processing module of the embodiment, on which an RC series circuit and capacitors are mounted.
Figure 4:
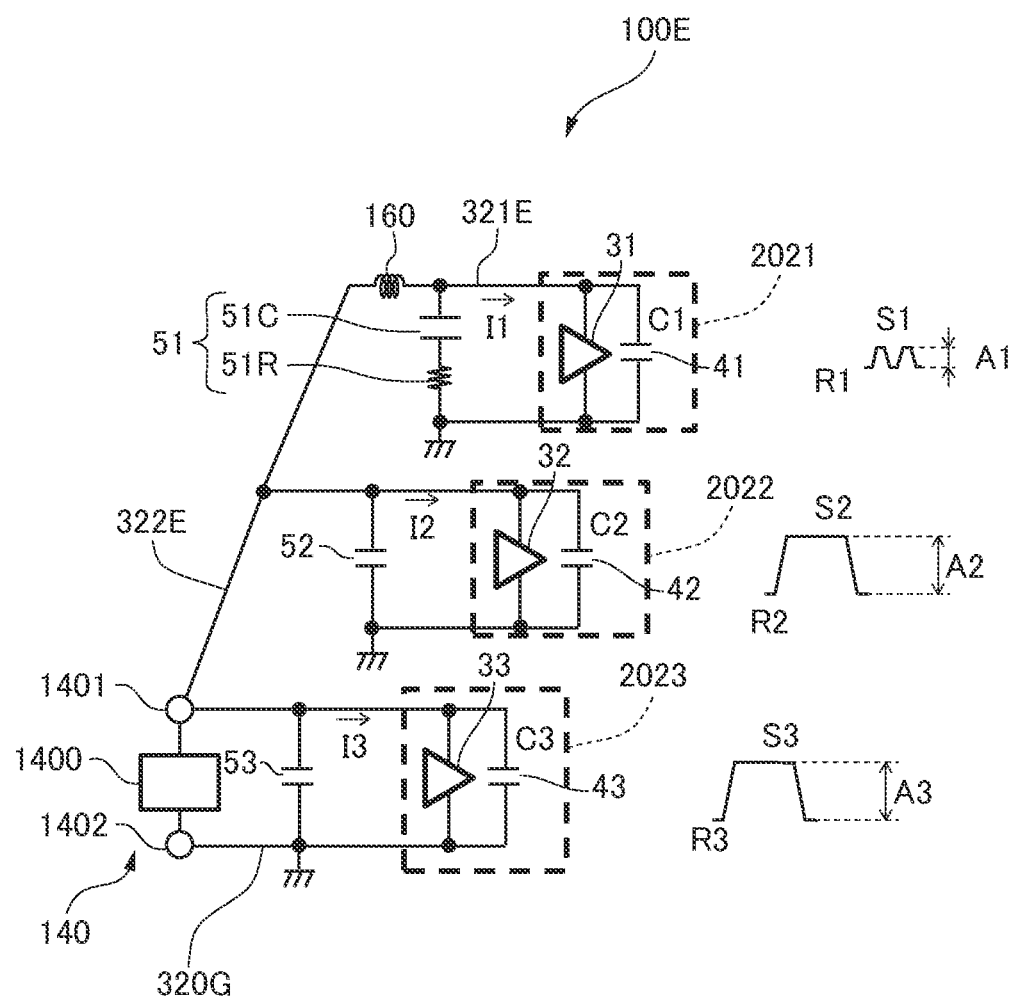
FIG. 4 is an equivalent circuit diagram of an electric circuit included in the processing module of the embodiment.

FIG. 3 is a schematic diagram for illustrating a wiring structure of a portion of the processing module 100 of the embodiment, on which the RC series circuit 51 and the capacitors 52 and 53 are mounted. FIG. 4 is an equivalent circuit diagram of an electric circuit 100E included in the processing module 100 of the embodiment. The printed wiring board 300 includes a plurality of conductor layers 301, 302, and 303, and solder resist layers (not illustrated). Each of the conductor layers 301 to 303 is a layer on which conductor patterns are formed. The conductor layer 301 is an outer layer, or a surface layer, formed on the main surface 311; and the conductor layer 302 is an outer layer, or a surface layer, formed on the main surface 312. The conductor layer 303 is an inner layer formed in the insulating board 310, that is, between the conductor layer 301 and the conductor layer 302. In each of the conductor layers 301 and 302, the portion of the conductor patterns other than the pads used for solder joint is covered with a solder resist layer. The pads are solder mask defined (SMD) pads or non-solder mask defined (NSMD) pads.

The plurality of terminals 204 includes a power supply terminal 211E, a ground terminal 211G, a power supply terminal 212E, a ground terminal 212G, a power supply terminal 213E, and a ground terminal 213G. The power supply terminal 211E is one example of a first power-supply terminal. The ground terminal 211G is one example of a first ground terminal. The power supply terminal 212E is one example of a second power-supply terminal. The ground terminal 212G is one example of a second ground terminal. The power supply terminal 213E is one example of the second power-supply terminal. The ground terminal 213G is one example of the second ground terminal. The power supply terminal 211E is electrically connected to a power supply terminal of the circuit 2021, and the ground terminal 211G is electrically connected to a ground terminal of the circuit 2021. The power supply terminal 212E is electrically connected to a power supply terminal of the circuit 2022, and the ground terminal 212G is electrically connected to a ground terminal of the circuit 2022. The power supply terminal 213E is electrically connected to a power supply terminal of the circuit 2023, and the ground terminal 213G is electrically connected to a ground terminal of the circuit 2023.

The circuit 2021 is electrically connected to the printed wiring board 300 via the power supply terminal 211E and the ground terminal 211G. The circuit 2022 is electrically connected to the printed wiring board 300 via the power supply terminal 212E and the ground terminal 212G. The circuit 2023 is electrically connected to the printed wiring board 300 via the power supply terminal 213E and the ground terminal 213G.

The printed wiring board 300 includes a power supply line 321E that is electrically connected with the power supply terminal 211E, and a power supply line 322E that is electrically connected with the power supply terminal 212E and the power supply terminal 213E. Thus, the circuit 2021 is electrically connected to the power supply line 321E via the power supply terminal 211E, and electrically connected to a ground line 320G via the ground terminal 211G. The circuit 2022 is electrically connected to the power supply line 322E via the power supply terminal 212E, and electrically connected to the ground line 320G via the ground terminal 212G. The circuit 2023 is electrically connected to the power supply line 322E via the power supply terminal 213E, and electrically connected to the ground line 320G via the ground terminal 213G. The power supply line 321E is one example of a first power supply line. The power supply line 322E is one example of a second power supply line. The printed wiring board 300 includes the ground line 320G that is electrically connected with the ground terminals 211G, 212G, and 213G. That is, the ground terminals 211G, 212G, and 213G are electrically connected with each other via the common ground line 320G.

The capacitor 51C has a pair of electrodes 11 and 12. The resistor 51R has a pair of electrodes 13 and 14. The capacitor 52 has a pair of electrodes 15 and 16. The capacitor 53 has a pair of electrodes 17 and 18.

The RC series circuit 51, the capacitor 52, and the capacitor 53 respectively reduce the power-supply potential fluctuation of the circuit 2021, the circuit 2022, and the circuit 2023. Each of the capacitors 51C, 52, and 53 is a so-called bypass capacitor. The RC series circuit 51 is disposed between the power supply terminal 211E and the ground terminal 211G. The capacitor 52 is disposed between the power supply terminal 212E and the ground terminal 212G. The capacitor 53 is disposed between the power supply terminal 213E and the ground terminal 213G.

The power supply terminal 211E of the semiconductor device 200 and the electrode 11 of the capacitor 51C are electrically connected with each other via the power supply line 321E. The power supply terminal 212E of the semiconductor device 200, the power supply terminal 213E of the semiconductor device 200, the electrode 15 of the capacitor 52, and the electrode 17 of the capacitor 53 are electrically connected with each other via the power supply line 322E. The ground terminals 211G, 212G, and 213G of the semiconductor device 200, the electrode 14 of the resistor 51R, the electrode 16 of the capacitor 52, and the electrode 18 of the capacitor 53 are electrically connected with each other via the ground line 320G. The electrode 12 of the capacitor 51C and the electrode 13 of the resistor 51R are electrically connected with each other via a connection line 323.

The power supply lines 321E and 322E and the ground line 320G are the power supply path, via which the power supply device 140 supplies electric power to the semiconductor device 200. Thus, the circuits 2021, 2022 and 2023 of the semiconductor element 202 are supplied with the electric power, or the power supply current, by the power supply device 140 via the power supply lines 321E and 322E.

Each of the power supply line 321E, the power supply line 322E, the ground line 320G, and the connection line 323 is a conductor formed on the insulating board 310 and made of a material such as copper.

The power supply line 321E includes a power supply pattern 331E formed in the conductor layer 301, a power supply pattern 341E formed in the conductor layer 302, and a power supply via 351E formed in contact with the power supply pattern 331E and the power supply pattern 341E.

The power supply via 351E is a via conductor that connects the power supply pattern 331E and the power supply pattern 341E. A pad of the power supply pattern 331E is joined with the power supply terminal 211E. A pad of the power supply pattern 341E is joined with the electrode 11 of the capacitor 51C.

The power supply line 322E includes power supply patterns 332E and 333E formed in the conductor layer 301, and a power supply pattern 342E formed in the conductor layer 302. In addition, the power supply line 322E includes a power supply via 352E formed in contact with the power supply pattern 332E and the power supply pattern 342E, and a power supply via 353E formed in contact with the power supply pattern 333E and the power supply pattern 342E.

The power supply via 352E is a via conductor that connects the power supply pattern 332E and the power supply pattern 342E. The power supply via 353E is a via conductor that connects the power supply pattern 333E and the power supply pattern 342E. A pad of the power supply pattern 332E is joined with the power supply terminal 212E. A pad of the power supply pattern 333E is joined with the power supply terminal 213E. One of two pads of the power supply pattern 342E is joined with the electrode 15 of the capacitor 52, and the other is joined with the electrode 17 of the capacitor 53.

The ground line 320G includes a ground pattern 331G formed in the conductor layer 301, a ground pattern 332G formed in the conductor layer 301, and a ground pattern 333G formed in the conductor layer 301. The ground line 320G also includes a ground pattern 341G formed in the conductor layer 302, a ground pattern 342G formed in the conductor layer 302, and a ground pattern 343G formed in the conductor layer 302. The ground line 320G also includes a ground via 351G formed in contact with the ground pattern 331G and the ground pattern 341G. The ground line 320G also includes a ground via 352G formed in contact with the ground pattern 332G and the ground pattern 342G. The ground line 320G also includes a ground via 353G formed in contact with the ground pattern 333G and the ground pattern 343G.

The ground via 351G is a via conductor that connects the ground pattern 331G and the ground pattern 341G. A pad of the ground pattern 331G is joined with the ground terminal 211G. A pad of the ground pattern 341G is joined with the electrode 14 of the resistor 51R.

The ground via 352G is a via conductor that connects the ground pattern 332G and the ground pattern 342G. A pad of the ground pattern 332G is joined with the ground terminal 212G. A pad of the ground pattern 342G is joined with the electrode 16 of the capacitor 52.

The ground via 353G is a via conductor that connects the ground pattern 333G and the ground pattern 343G. A pad of the ground pattern 333G is joined with the ground terminal 213G. A pad of the ground pattern 343G is joined with the electrode 18 of the capacitor 53.

One of two pads of the connection line 323 is joined with the electrode 12 of the capacitor 51C, and the other is joined with the electrode 13 of the resistor 51R.

The power supply via 351E is disposed close to the capacitor 51C. The power supply via 352E is disposed close to the capacitor 52. The power supply via 353E is disposed close to the capacitor 53. The ground via 351G is disposed close to the resistor 51R. The ground via 352G is disposed close to the capacitor 52. The ground via 353G is disposed close to the capacitor 53.

The power supply device 140 includes a power supply terminal 1401 (FIG. 4) and a ground terminal 1402. The power supply terminal 1401 of the power supply device 140 is electrically connected to the power supply line 322E. The ground terminal 1402 of the power supply device 140 is electrically connected to the ground line 320G. The power supply device 140 includes a power supply circuit 1400 that supplies electric power to the circuits 2021, 2022, and 2023.

The ground line 320G includes a ground pattern 364G formed in the conductor layer 302, and a ground via 354G disposed close to the power supply device 140. A pad of the ground pattern 364G is joined with the ground terminal 1402 of the power supply device 140. The ground pattern 364G is in contact with the ground via 354G, so that the ground pattern 364G is connected to the ground via 354G.

The ground line 320G also includes a ground pattern 350G formed in the conductor layer 303, which is formed in the insulating board 310 (FIG. 2). The ground pattern 350G is a solid conductor pattern formed in almost all the conductor layer 303. The ground pattern 350G is in contact with the ground via 351G, the ground via 352G, the ground via 353G, and the ground via 354G in the conductor layer 303; and is connected to the ground via 351G, the ground via 352G, the ground via 353G, and the grand via 354G.

In addition, a low pass filter is disposed between the power supply line 321E and the power supply line 322E. In the present embodiment, a ferrite bead 160 as the low pass filter is disposed between the power supply line 321E and the power supply line 322E. The ferrite bead 160 is an electric component that electrically connects the power supply line 321E and the power supply line 322E. The ferrite bead 160 is one example of noise filters. The ferrite bead 160 has a pair of electrodes 21 and 22. The electrode 21 is joined with a pad of the power supply pattern 341E of the power supply line 321E. The electrode 22 is joined with a pad of the power supply pattern 342E of the power supply line 322E.

The power supply terminal 1401 of the power supply device 140 is electrically connected to the power supply terminals 212E and 213E of the semiconductor device 200, the electrode 15 of the capacitor 52, and the electrode 17 of the capacitor 53 via the power supply line 322E. In addition, the power supply terminal 1401 of the power supply device 140 is electrically connected to the electrode 22 of the ferrite bead 160 via the power supply line 322E. In addition, the power supply terminal 1401 of the power supply device 140 is electrically connected to the power supply terminal 211E of the semiconductor device 200 and the electrode 11 of the capacitor 51C via the power supply line 322E, the ferrite bead 160, and the power supply line 321E.

The ground terminal 1402 of the power supply device 140 is electrically connected to the ground terminals 211G, 212G, and 213G of the semiconductor device 200 via the ground line 320G. In addition, the ground terminal 1402 of the power supply device 140 is electrically connected to the electrode 14 of the resistor 51R, the electrode 16 of the capacitor 52, and the electrode 18 of the capacitor 53.

In the above-described wiring structure, the power supply device 140 applies a direct-current voltage between the power supply line 322E and the ground line 320G, and thereby supplies electric power, or power supply current, to the circuits 2021, 2022, and 2023. The power supply terminal 211E of the semiconductor device 200 is applied with a power supply potential by the power supply device 140, via the power supply line 322E, the ferrite bead 160 that is one example of noise filters, and the power supply line 321E. The power supply terminals 212E and 213E of the semiconductor device 200 are applied with a power supply potential by the power supply device 140, via the power supply line 322E. The ground terminals 211G to 213G of the semiconductor device 200 are applied with a ground potential via the ground line 320G.

The circuit 2021 includes a circuit element 31 and a capacitance component 41. The circuit 2022 includes a circuit element 32 and a capacitance component 42. The circuit 2023 includes a circuit element 33 and a capacitance component 43. The circuit element 31 is one example of a first circuit element. The circuit element 32 is one example of a second circuit element. The circuit element 33 is one example of the second circuit element. The capacitance component 41 is one example of a first capacitance component. The capacitance component 42 is one example of a second capacitance component. The capacitance component 43 is one example of the second capacitance component. The capacitance components 41, 42, and 43 are capacitors that are called on-die capacitors.

The circuit element 31 transmits a digital signal S1. The circuit element 32 transmits a digital signal S2. The circuit element 33 transmits a digital signal S3. The digital signal S1 transmitted by the circuit element 31 is one example of a first digital signal. The digital signal S2 transmitted by the circuit element 32 is one example of a second digital signal. The digital signal S3 transmitted by the circuit element 33 is one example of the second digital signal.

A transmission rate R1 (bps) of the digital signal S1 transmitted by the circuit element 31 is higher than transmission rates R2 and R3 (bps) of the digital signals S2 and S3 transmitted by the circuit elements 32 and 33. In other words, the transmission rates R2 and R3 (bps) of the digital signals S2 and S3 are lower than the transmission rate R1 (bps) of the digital signals S1. That is, R1>R2 and R1>R3. The transmission rate R1 is a first transmission rate. The transmission rate R2 is a second transmission rate. The transmission rate R3 is the second transmission rate.

A voltage amplitude A1 of the digital signal S1 transmitted by the circuit element 31 is smaller than voltage amplitudes A2 and A3 of the digital signals S2 and S3 transmitted by the circuit elements 32 and 33. That is, A1<A2 and A1<A3. The voltage amplitude A1 is a first voltage amplitude. The voltage amplitude A2 is a second voltage amplitude. The voltage amplitude A3 is the second voltage amplitude. In addition, a capacitance C1 of the capacitance component 41 is larger than capacitances C2 and C3 of the capacitance components 42 and 43. In other words, the capacitances C2 and C3 of the capacitance components 42 and 43 are smaller than the capacitance C1 of the capacitance component 41. That is, C1>C2 and C1>C3. The capacitance C1 is a first capacitance. The capacitance C2 is a second capacitance. The capacitance C3 is the second capacitance. In addition, power supply currents I2 and I3 respectively supped to the circuits 2022 and 2023 when the circuits 2022 and 2023 operate are larger than a power supply current I1 supplied to the circuit 2021 when the circuit 2021 operates. That is, I1<I2 and I1<I3. The power supply current I1 is a first power-supply current. The power supply current I2 is a second power-supply current. The power supply current I3 is the second power-supply current.

Figure 8:
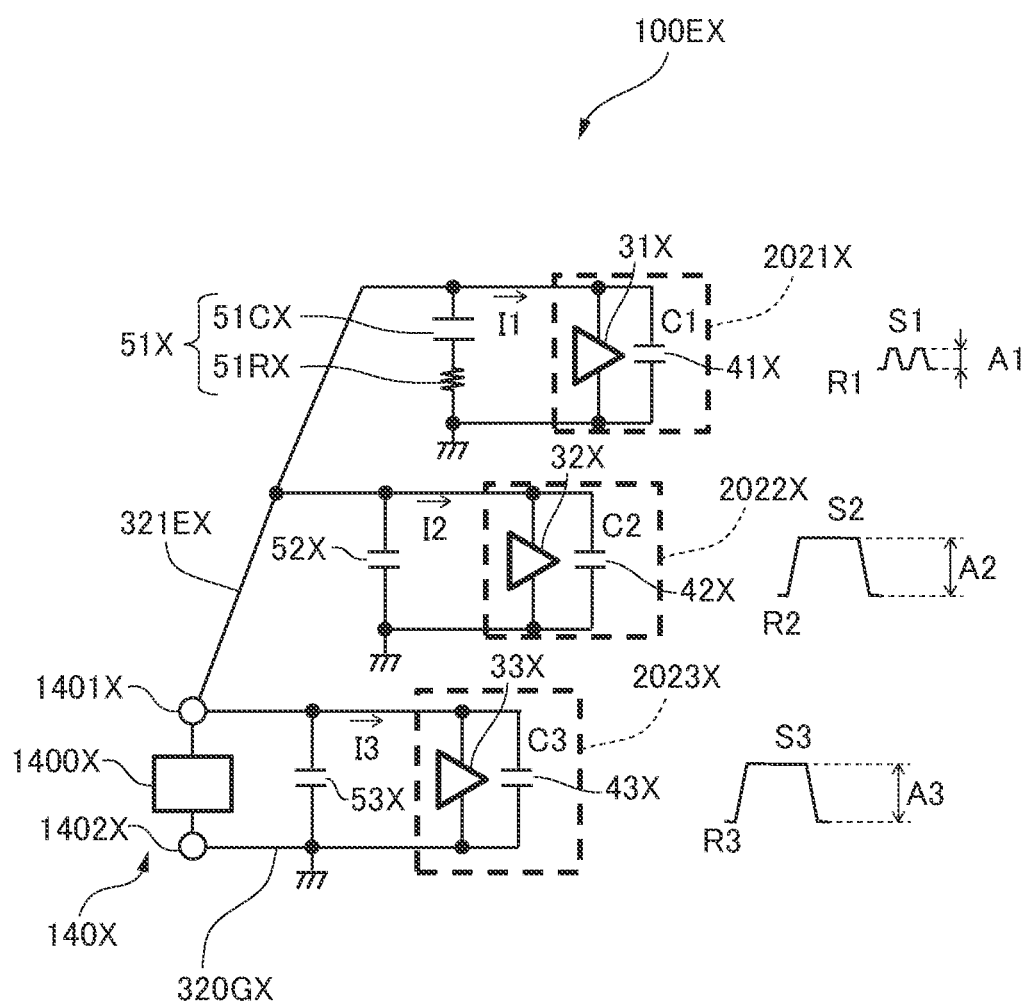
FIG. 8 is an equivalent circuit diagram of an electric circuit included in a processing module of a comparative example.

Next, an electric circuit included in a processing module of a comparative example will be described. FIG. 8 is an equivalent circuit diagram of an electric circuit 100EX included in the processing module of the comparative example. The electric circuit 100EX includes a power supply device 140X and three circuits 2021X, 2022X, and 2023X. The power supply device 140X and the circuits 2021X, 2022X, and 2023X are electrically connected with each other via a power supply line 321EX and a ground line 320GX. The power supply device 140X includes a power supply circuit 1400X, a power supply terminal 1401X, and a ground terminal 1402X for supplying electric power to the circuits 2021X to 2023X. The power supply terminal 1401X is connected to the power supply line 321EX and the ground terminal 1402X is connected to the ground line 320GX.

The circuit 2021X includes a circuit element 31X and a capacitance component 41X. For reducing the power-supply potential fluctuation of the circuit 2021X, an RC series circuit 51X is connected between the power supply line 321EX and the ground line 320GX. The RC series circuit 51X is constituted by a capacitor 51CX and a resistor 51RX.

The circuit 2022X includes a circuit element 32X and a capacitance component 42X. For reducing the power-supply potential fluctuation of the circuit 2022X, a capacitor 52X is connected between the power supply line 321EX and the ground line 320GX.

The circuit 2023X includes a circuit element 33X and a capacitance component 43X. For reducing the power-supply potential fluctuation of the circuit 2023X, a capacitor 53X is connected between the power supply line 321EX and the ground line 320GX.

The ferrite bead 160 of the present embodiment is not disposed on the power supply line 321EX of the electric circuit 100EX of the comparative example. The configuration of the circuits 2021X to 2023X is the same as that of the circuits 2021 to 2023. If the power supply noise produced by the operation of the circuits 2022X and 2023X propagates to the circuit 2021X, the operation of the circuit 2021X becomes unstable. The digital signal S1 transmitted by the circuit 2021X is higher in speed than the digital signals S2 and S3 transmitted by the circuits 2022X and 2023X. That is, the digital signals S2 and S3 are lower in speed than the digital signal S1. The voltage amplitude A1 of the digital signal S1 is smaller than the voltage amplitudes A2 and A3 of the digital signals S2 and S3, and the capacitance C1 of the capacitance component 41X is larger than the capacitances C2 and C3 of the capacitance components 42X and 43X. In addition, power supply currents I2 and I3 respectively suppled to the circuits 2022X and 2023X when the circuits 2022X and 2023X operate are larger than the power supply current I1 supplied to the circuit 2021X when the circuit 2021X operates. Thus, if the power supply noise produced by the operation of the circuits 2022X and 2023X propagates to the circuit 2021X, the operation of the circuit 2021X is affected by the power supply noise.

In the present embodiment, the power supply noise produced by the operation of the circuits 2022 and 2023 can be reduced from propagating to the circuit 2021, by the ferrite bead 160 and the RC series circuit 51. Since the power supply noise is reduced, the operation of the circuits 2021 to 2023 (in particular, the circuit 2021) becomes stable. In addition, in the present embodiment, since the RC series circuit 51, instead of only a capacitor, is connected between the power supply terminal 211E and the ground terminal 211G that are electrically connected with the circuit 2021, the power-supply potential fluctuation can be effectively reduced.

Example

Hereinafter, experimental results obtained in Example 1 and Comparative Example 1 will be described. Comparative Example 1 is a specific example of the above-described comparative example. Example 1 is a specific example of the above-described embodiment.

Comparative Example 1

In FIG. 8, the capacitance component 41X and the capacitor 51CX constitute a parallel circuit, and the parallel circuit and a parasitic inductance that is parasitic on each line segment constitute a resonance circuit. Note that each line segment includes not only the parasitic inductance but also a parasitic resistance. A characteristic of a source impedance Z11 of the circuit element 31X of the circuit 2021X is affected by the resonance circuit.

Similarly, the capacitance component 42X and the capacitor 52X constitute a parallel circuit, and the parallel circuit and a parasitic inductance that is parasitic on each line segment constitute a resonance circuit. Note that each line segment includes not only the parasitic inductance but also a parasitic resistance. A characteristic of a source impedance Z11 of the circuit element 32X of the circuit 2022X is affected by the resonance circuit.

Similarly, the capacitance component 43X and the capacitor 53X constitute a parallel circuit, and the parallel circuit and a parasitic inductance that is parasitic on each line segment constitute a resonance circuit. Note that each line segment includes not only the parasitic inductance but also a parasitic resistance. A characteristic of a source impedance Z11 of the circuit element 33X of the circuit 2023X is affected by the resonance circuit.

Figure 9A:
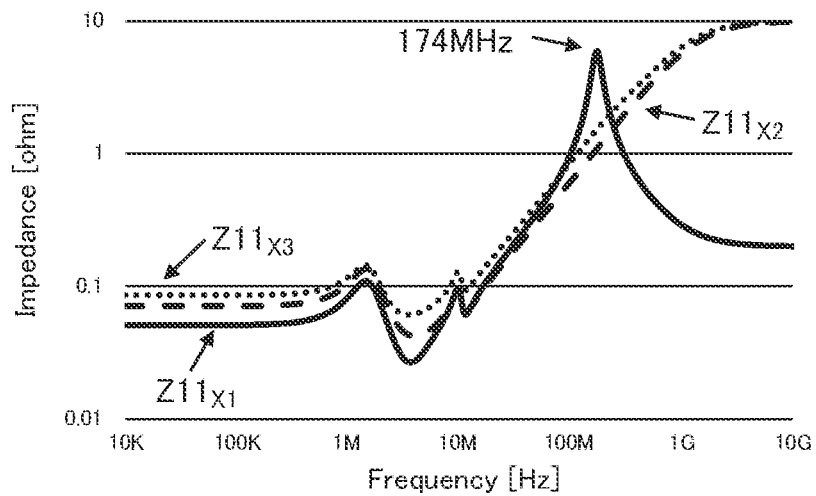
FIG. 9A is a graph illustrating a simulation result obtained in Comparative Example 1.

FIG. 9A is a graph illustrating a simulation result on the source impedance characteristic of Comparative Example 1. In FIG. 9A, the source impedance Z11 corresponding to the circuit element 31X is denoted by $Z11_{X1}$, the source impedance Z11 corresponding to the circuit element 32X is denoted by $Z11_{X2}$, and the source impedance Z11 corresponding to the circuit element 33X is denoted by $Z11_{X3}$. In FIG. 9A, the source impedance $Z11_{X1}$ is indicated by a solid line. In FIG. 9A, the source impedance $Z11_{X2}$ is indicated by a broken line. In FIG. 9A, the source impedance $Z11_{X3}$ is indicated by a dotted line.

In the simulation, the capacitance of the capacitance component 41X was set at 800 pF, and the capacitance of the capacitance components 42X and 43X was set at 0 F. The capacitance of the capacitors 51CX, 52X, and 53X was set at 1 µF. The electrical resistance value of the resistor 51RX was set at 1.1Ω. The inductance value of the power supply line that connects the capacitor 51CX and the circuit element 31X was set at 1040 pH. The inductance value of the power supply line that connects the capacitor 52X and the circuit element 32X was set at 720 pH. The inductance value of the power supply line that connects the capacitor 53X and the circuit element 33X was set at 950 pH.

The source impedance $Z11_{X2}$ increases in a frequency band higher than a self-resonant frequency of the capacitor 52X and the source impedance $Z11_{X3}$ increases in a frequency band higher than a self-resonant frequency of the capacitor 53X. On the other hand, in the source impedance $Z11_{X1}$, anti-resonance occurs in a frequency band higher than a self-resonant frequency of the capacitor 51CX. The anti-resonance is caused by the capacitance component 41X and the parasitic inductance of the power supply path of the printed wiring board and the semiconductor package. The resonant frequency ω at which the anti-resonance occurs in the circuit is expressed by the equation (1).

$$\omega = \frac{1}{\sqrt{LC}} \quad (1)$$

If a value of 1040 pH is substituted for L and a value of 800 pF is substituted for C in the equation (1), the resonant frequency ω becomes 174 MHz. The source impedance $Z11_{X1}$ of the circuit element 31X has the maximum value, or the peak value, at the resonant frequency ω, caused by the occurrence of the anti-resonance. The source impedance $Z11_{X1}$ decreases in a frequency band higher than the resonant frequency ω.

Each of the circuit elements 31X to 33X is supplied with electric power, necessary for operating the circuit element, mainly from a capacitance component and a capacitor disposed close to the circuit element. At and near the frequency at which the anti-resonance occurs, each of the source impedances $Z11_{X2}$ and $Z11_{X3}$ is lower than the source impedance $Z11_{X1}$. Thus, the circuit 2021X is subjected to the interference of the power supply noise produced by the operation of the circuits 2022X and 2023X. In particular, in a case where the circuits 2022X and 2023X operate at low speed and the circuit 2021X operates at high speed, the voltage amplitudes A2 and A3 of the digital signals S2 and S3 are larger than the voltage amplitude A1 of the digital signal S1. Thus, the power-supply potential fluctuation measured in the circuit 2021X becomes larger.

Figure 9B:
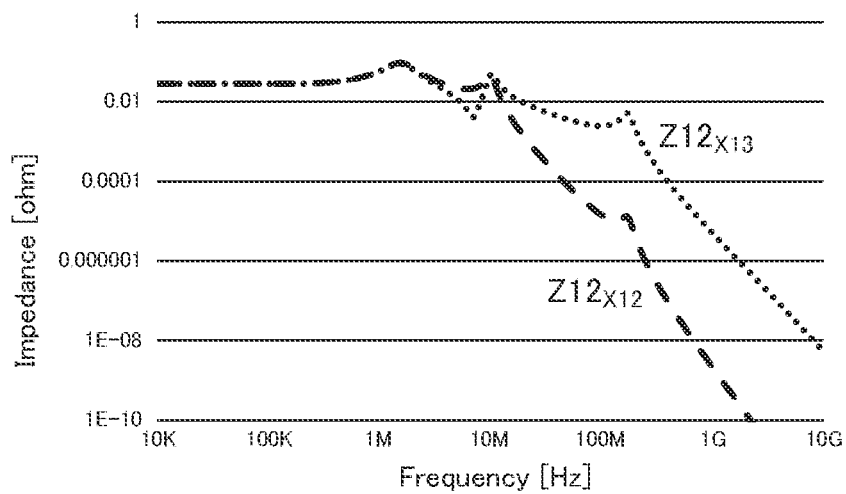
FIG. 9B is a graph illustrating a simulation result obtained in Comparative Example 1.

FIG. 9B is a graph illustrating a simulation result on the transfer impedance characteristic of Comparative Example 1. A transfer impedance Z12 between the circuit element 31X of the circuit 2021X and the circuit element 32X of the circuit 2022X is denoted by $Z12_{X12}$. A transfer impedance Z12 between the circuit element 31X of the circuit 2021X and the circuit element 33X of the circuit 2023X is denoted by $Z12_{X13}$. In FIG. 9B, the transfer impedance $Z12_{X12}$ is indicated by a broken line. In FIG. 9B, the transfer impedance $Z12_{X13}$ is indicated by a dotted line. In particular, the transfer impedance $Z12_{X13}$ has a higher value in a frequency band up to the frequency 174 MHz at which the anti-resonance occurs.

Figure 9C:
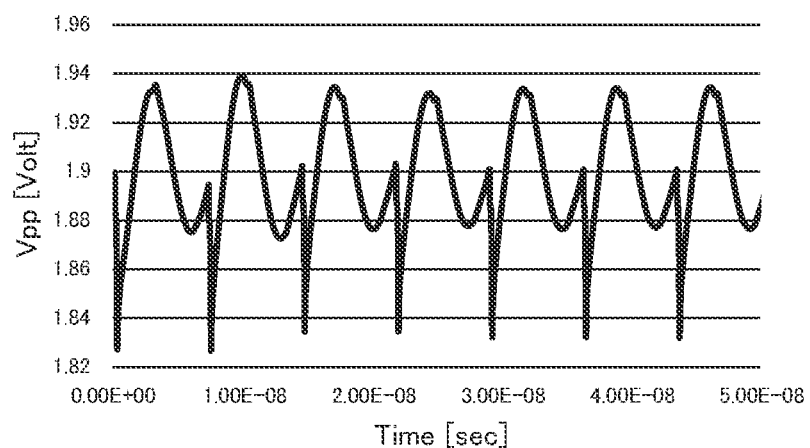
FIG. 9C is a graph illustrating a simulation result obtained in Comparative Example 1.

FIG. 9C is a graph illustrating a simulation result on the power-supply potential fluctuation of the circuit element 31X of Comparative Example 1. As illustrated in FIG. 9C, the maximum amplitude of the power-supply potential fluctuation is 112 mV. The circuit 2021X operates in a cycle of 140 MHz, and the circuits 2022X and 2023X operate every 50 nsec. When the circuit 2021X operates alone, the power-supply potential fluctuation obtained in the simulation is 86 mV. In this case, even if the resistance value of the resistor 51RX is 0Ω, the power-supply potential fluctuation is 104 mV. Thus, the power-supply potential fluctuation is increased by the noise interference.

The present inventors have found that when electric power is supplied from the single power supply device 140X to the two or more circuits 2021X to 2023X having different features, the noise interference occurs through the power supply path.

In addition, the present inventors have assumed that in the configuration for reducing the source impedance of the high-speed circuit 2021X, if the low-speed circuits 2022X and 2023X are connected to the power supply line 321EX having the same electric potential, the path for supplying current changes. Thus, the present inventors have assumed that since the circuit element 31X is supplied with electric power from the capacitor 52X or 53X, the noise interference occurs.

In addition, the present inventors have studied a configuration in which a high-impedance noise filter is disposed between the circuit element 31X and the circuit elements 32X and 33X a capacitor is disposed in place of the RC series circuit 51X; and an RC series circuit is disposed in place of the capacitor 52X. As a result, the present inventors have found that even in such a configuration, since the circuit element 31X is supplied with electric power from the capacitor 53X, the noise interference occurs.

Example 1

An electric circuit 100E illustrated in FIG. 4 will be described. The capacitance C1 of the capacitance component 41 of the circuit 2021 was set at 800 pF. The capacitance of the capacitor 51C of the RC series circuit 51 was set at 1 µF. The electrical resistance value of the resistor 51R of the RC series circuit 51 was set at 1.1Ω.

The capacitance C2 of the capacitance component 42 of the circuit 2022 was approximated at 0 pF. The capacitance of the capacitors 52 was set at 1 µF. The capacitance C3 of the capacitance component 43 of the circuit 2023 was also approximated at 0 pF. The capacitance of the capacitors 53 was also set at 1 µF. Note that the capacitances C1, C2, and C3 of the capacitance components 41, 42, and 43 can be measured by using an instrument, such as an LCR meter or a network analyzer.

The inductance value of the power supply line that connects the capacitor 51C and the circuit element 31 was set at 1040 pH. The inductance value of the power supply line that connects the capacitor 52 and the circuit element 32 was set at 720 pH. The inductance value of the power supply line that connects the capacitor 53 and the circuit element 33 was set at 950 pH. The ferrite bead 160 used is a low-pass-filer component that has an impedance value of 120Ω at 100 MHz.

By the way, if the capacitance of a capacitance component disposed in the semiconductor integrated circuit is increased, the source impedance is decreased in a high-frequency band. Thus, when the circuit operates at high speed, the power-supply potential fluctuation can be effectively reduced. For this reason, it is preferable that a capacitance component be disposed in the circuit (in particular, the circuit that operates at high speed), for reducing the power-supply potential fluctuation. On the other hand, an I/O power source included in a circuit that operates at low speed has high noise resistance. For this reason, it is preferable that no capacitance component be disposed in the circuit, and that a capacitor be disposed on the printed wiring board for reducing inductance and reducing the power-supply potential fluctuation.

Figure 5A:
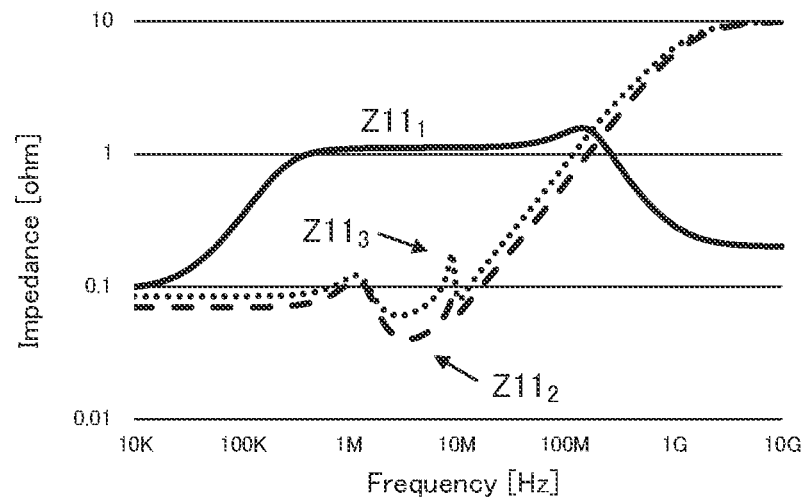
FIG. 5A is a graph illustrating a simulation result obtained in Example 1.

In the circuit configuration illustrated in FIG. 4, the source impedance Z11 of each of the circuit elements 31, 32, and 33 was simulated. FIG. 5A is a graph illustrating a simulation result on the source impedance characteristic of Example 1. In FIG. 5A, a source impedance Z11 corresponding to the circuit element 31 is denoted by Z111, a source impedance Z11 corresponding to the circuit element 32 is denoted by Z112, and a source impedance Z11 corresponding to the circuit element 33 is denoted by Z113. In FIG. 5A, the source impedance Z111 is indicated by a solid line. In FIG. 5A, the source impedance Z112 is indicated by a broken line. In FIG. 5A, the source impedance Z113 is indicated by a dotted line.

The peak value of the source impedance Z111 caused by the anti-resonance is made smaller than that of Comparative Example 1 at and near the anti-resonant frequency of 174 MHz, by the resistor 51R and the ferrite bead 160.

Figure 5B:
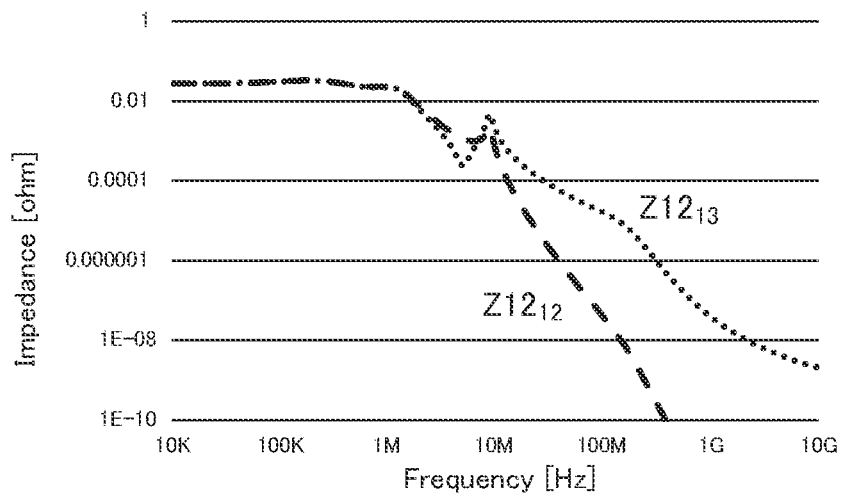
FIG. 5B is a graph illustrating a simulation result obtained in Example 1.

FIG. 5B is a graph illustrating a simulation result on the transfer impedance characteristic of Example 1. A transfer impedance Z12 between the circuit element 31 of the circuit 2021 and the circuit element 32 of the circuit 2022 is denoted by $Z12_{12}$. A transfer impedance Z12 between the circuit element 31 of the circuit 2021 and the circuit element 33 of the circuit 2023 is denoted by $Z12_{13}$. In FIG. 5B, the transfer impedance $Z12_{12}$ is indicated by a broken line. In FIG. 5B, the transfer impedance $Z12_{13}$ is indicated by a dotted line. In comparison with Comparative Example 1 illustrated in FIG. 9B, the transfer impedances $Z12_{12}$ and $Z12_{13}$ have smaller values in a frequency band equal to or larger than 1 MHz, so that the noise interference is reduced. In particular, the transfer impedances $Z12_{12}$ and $Z12_{13}$ are significantly decreased at and near the frequency of 174 MHz at which the anti-resonance occurs in the circuit element 31.

Figure 5C:
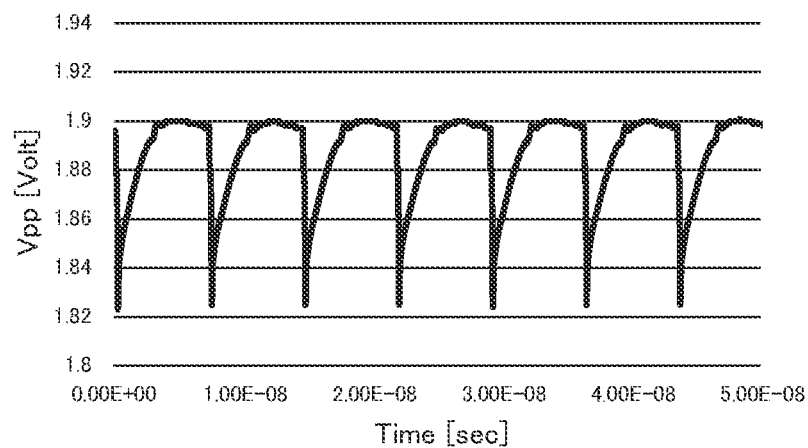
FIG. 5C is a graph illustrating a simulation result obtained in Example 1.

FIG. 5C is a graph illustrating a simulation result on the power-supply potential fluctuation of the circuit element 31 of Example 1. The maximum amplitude of the power-supply potential fluctuation is 77.9 mV. Thus, the noise interference is reduced, and the power-supply potential fluctuation is reduced.

In this manner, the transfer impedances $Z12_{12}$ and $Z12_{13}$ are reduced in both of a frequency band in which the low-speed circuit elements 32 and 33 are supplied with electric power from the capacitors 52 and 53, and a frequency band in which the anti-resonance occurs in the high-speed circuit element 31. Therefore, the noise interference is reduced between the circuit element 31 and the circuit elements 32 and 33.

Even if the circuit elements 32 and 33 operate periodically, the noise interference is reduced between the circuit element 31 and the circuit elements 32 and 33 because the transfer impedances $Z12_{12}$ and $Z12_{13}$ are reduced in a frequency band in which the circuit elements 32 and 33 are supplied with electric power from the capacitors 52 and 53. Note that a circuit element that operates periodically is, for example, a circuit element that transmits periodic signals.

The effective range of the value of each of the capacitance component 41, the capacitor 51C, the resistor 51R, and the ferrite bead 160 is a range that allows the source impedance caused by the anti-resonance of the circuit element 31, to be reduced. In addition, it is preferable that the anti-resonance of source impedance do not occur at half the operating frequency of the circuit element 31 and at double the operating frequency (i.e., the frequency of the second harmonic) of the circuit element 31.

The source impedance in a case where the ferrite bead 160 is not disposed is determined by the capacitor 51C, the capacitance component 41, and the parasitic inductance of the power supply path. For example, in FIG. 9A, the source impedance $Z11_{X1}$ is 5.9Ω at the frequency of 174 MHz at which the anti-resonance occurs. Thus, if the source impedance Z111 is made smaller than 5.9Ω by adding the ferrite bead 160, the noise interference can be reduced.

In the circuit configuration of Example 1, if the capacitance of the capacitance component 41 is decreased to 400 pF, the resonant frequency becomes 247 MHz. In this case, since the resonant frequency is lower than the frequency (i.e., 280 MHz) of the second harmonic, the noise interference can be effectively reduced.

If the electrical resistance value of the resistor 51R is increased, the source impedance increases in a low-frequency band. Thus, it is preferable that the constant, or the electrical resistance value, of the resistor 51R be not increased excessively. Specifically, it is preferable that the electrical resistance value of the resistor 51R be determined in consideration of the source impedance obtained at half the operating frequency and at the frequency at which the anti-resonance occurs in the circuit elements 32 and 33.

The capacitance of the capacitance component 41 is larger than the capacitance of the capacitance components 42 and 43. In the simulation, the capacitance of the capacitance components 42 and 43 was set at 0 F for a case where capacitance cells are not disposed on the circuits 2022 and 2023. However, the present disclosure is not limited to this. Since the circuits 2022 and 2023 have parasitic capacitance, the capacitance components 42 and 43 may be the parasitic capacitance.

In addition, the power supply device 140 may not be directly connected to the power supply line 322E. For example, a noise filter (not illustrated) may be disposed between the power supply terminal 1401 of the power supply device 140 and the power supply line 322E.

In addition, the ground line 320G may include a plurality of grounds independent from each other, and the plurality of ground terminals 211G to 213G may be connected to respective ones of the plurality of grounds. The ground patterns independent from each other may be connected with each other via noise filters, such as ferrite beads.

In addition, each of the capacitors 52 and 53 may not necessarily be a single capacitor component, and may be a plurality of capacitor components connected in parallel with each other. In addition, for suppressing the increase of the source impedance, it is preferable that a resistor be not connected in series with each of the capacitors 52 and 53.

In addition, since the capacitor 51C and the resistor 51R of the RC series circuit 51 have only to be connected in series with each other, the positional relationship between the capacitor 51C and the resistor 51R is not limited to the positional relationship illustrated in FIG. 4. For example, the capacitor 51C and the resistor 51R may be interchanged in position. In addition, although the description has been made for the case where the electric circuit 100E includes the single RC series circuit 51, the present disclosure is not limited to this. For example, the electric circuit 100E may include a plurality of RC series circuits 51 connected in parallel with each other.

In addition, although the description has been made for the case where the noise filter that electrically connects the power supply line 321E and the power supply line 322E is the ferrite bead 160, the present disclosure is not limited to this. For example, it is preferable that the noise filter be a low pass filter that includes a chip inductor.

In addition, the noise filter has only to be a component that has an impedance larger than the source impedance of each of the circuit elements 31, 32, and 33. For example, the noise filter may be a jumper wire.

In addition, the noise filter may not be a single noise filter. For example, another noise filter may be disposed on the ground line.

In addition, although the description has been made for the case where the circuits 2021, 2022, and 2023 are included in the identical semiconductor device 200, the present disclosure is not limited to this. For example, the circuits 2021, 2022, and 2023 may be semiconductor devices different from each other.

In addition, although the description has been made for the case where the terminal structure of the semiconductor device 200 is BGA, the present disclosure is not limited to this. For example, the terminal structure of the semiconductor device 200 may be a land grid array (LGA) or a lead frame.

In addition, although the description has been made for the case where the resistor 51R and the capacitors 51C, 52, and 53 are mounted on the main surface 312 of the printed wiring board 300 opposite to the main surface 311 on which the semiconductor device 200 is mounted, the present disclosure is not limited to this. In addition, although the description has been made for the case where the ground pattern 350G of the printed wiring board 300 is formed in the conductor layer 303 that is an inner layer, the present disclosure is not limited to this. The ground line 320G may have any wiring structure as long as the ground line 320G has a low impedance.

Other Modifications

Figure 6:
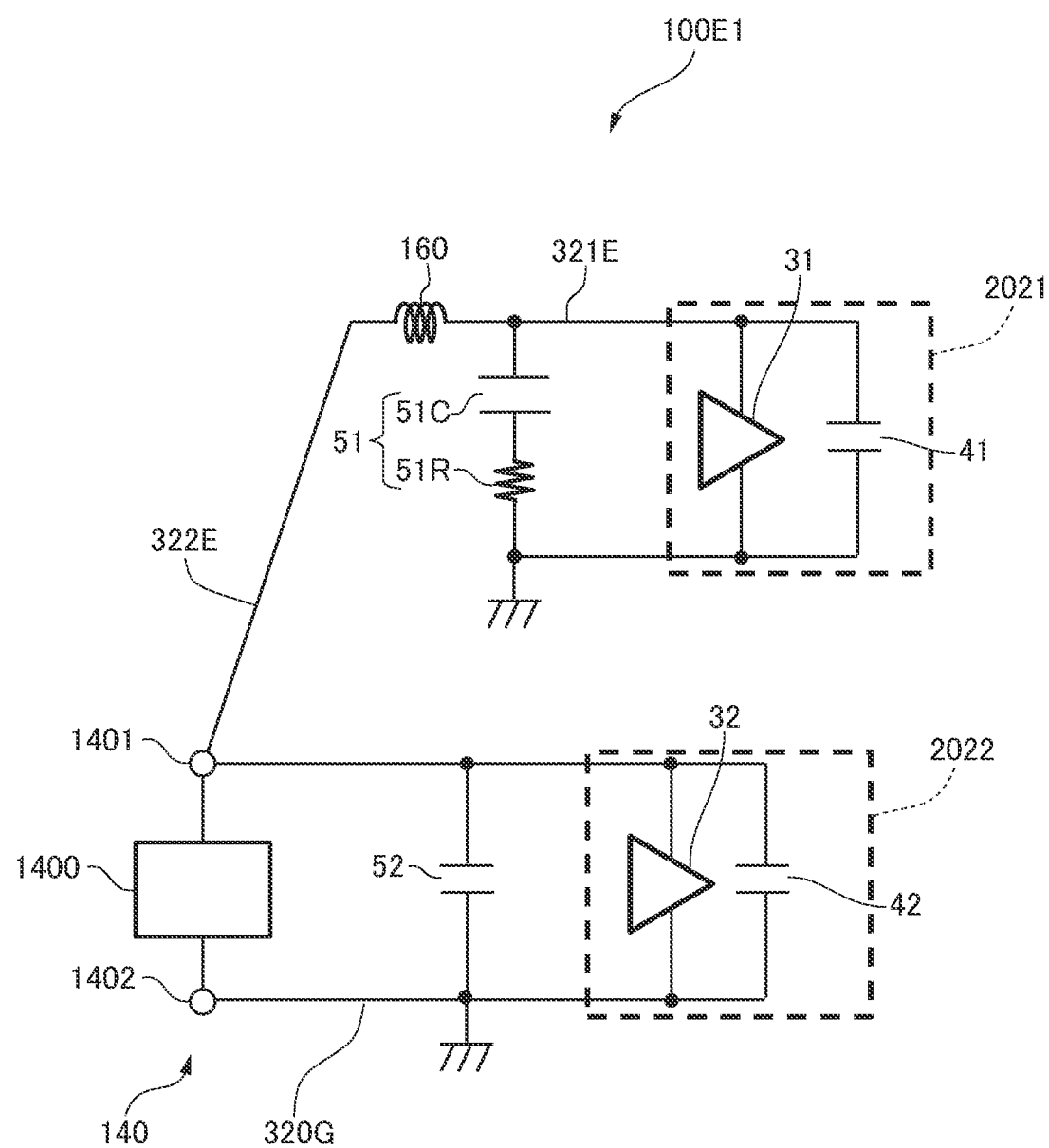
FIG. 6 is an equivalent circuit diagram of an electric circuit of a modification.

In the above-described embodiment, the description has been made for the case where the electric circuit 100E includes the circuits 2022 and 2023, as one example case in which the electric circuit 100E includes a plurality of second circuits. However, the present disclosure is not limited to this. FIG. 6 is a diagram illustrating an electric circuit 100E1 of a modification. FIG. 6 illustrates an equivalent circuit of the electric circuit 100E1. As illustrated in FIG. 6, the present invention can also be applied when the electric circuit 100E1 includes a single second circuit, for example, when the electric circuit 100E1 does not include the circuit 2023 and the capacitor 53.

Figure 7A:
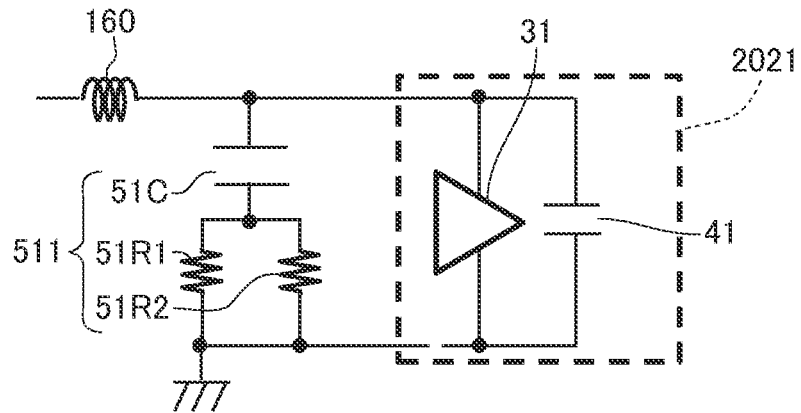
FIG. 7A is a diagram illustrating one example of an RC series circuit of a modification.
Figure 7B:
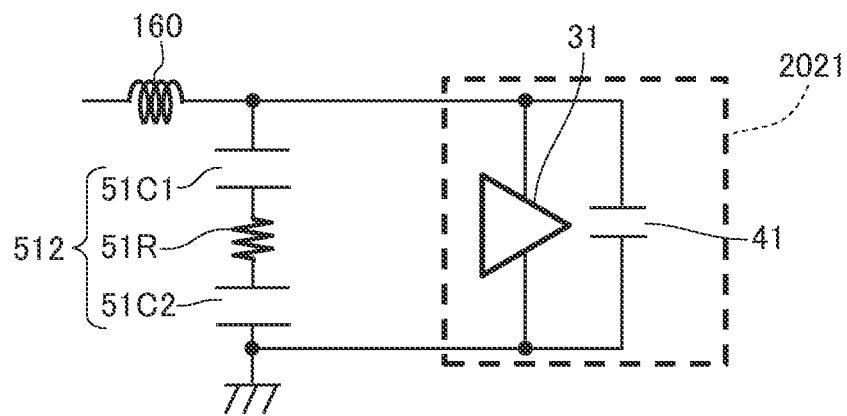
FIG. 7B is a diagram illustrating one example of an RC series circuit of a modification.
Figure 7C:
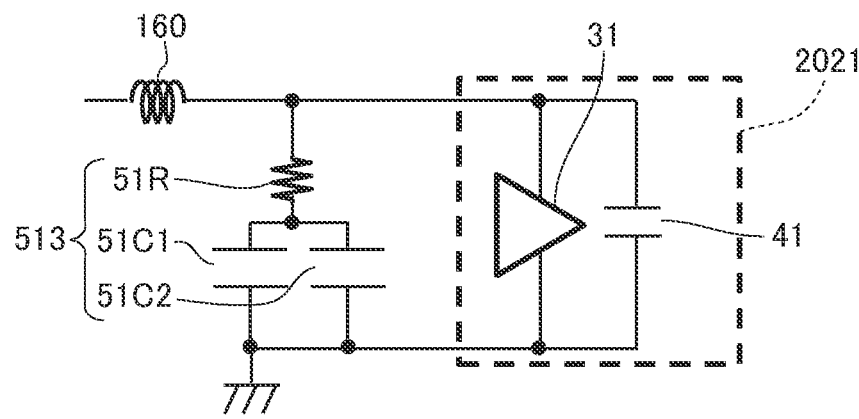
FIG. 7C is a diagram illustrating one example of an RC series circuit of a modification.

In addition, since the RC series circuit has only to include at least one resistor and at least one capacitor, the RC series circuit can be variously modified. FIGS. 7A to 7C are diagrams each illustrating one example of an RC series circuit of a modification. Each of FIGS. 7A to 7C illustrates an equivalent circuit of an RC series circuit and a surrounding circuit connected to the RC series circuit.

An RC series circuit 511 of a modification illustrated in FIG. 7A includes a single capacitor 51C and two resistors 51R1 and 51R2. The two resistors 51R1 and 51R2 are connected in parallel with each other. The capacitor 51C and a parallel circuit constituted by the two resistors 51R1 and 51R2 are connected in series with each other. If the combined-resistance value of the parallel circuit, constituted by the two resisters 51R1 and 51R2, is 1.1Ω, the electrical resistance value of each of the resistors 51R1 and 51R2 is 2.2Ω.

An RC series circuit 512 of a modification illustrated in FIG. 7B includes two capacitors 51C1 and 51C2 and a single resistor 51R. These components may be connected in series with each other in the order of the capacitor 51C1, the resistor 51R, and the capacitor 51C2.

An RC series circuit 513 of a modification illustrated in FIG. 7C includes two capacitors 51C1 and 51C2 and a single resistor 51R. The two capacitors 51C1 and 51C2 are connected in parallel with each other. The resistor 51R and a parallel circuit constituted by the two capacitors 51C1 and 51C2 are connected in series with each other.

In this manner, the configuration of the RC series circuit can be variously modified. In addition, a plurality of RC series circuits of a modification may be connected in parallel with each other.

The present invention is not limited to the above-described embodiment, and can be modified within a technical concept of the present invention. In addition, the effects described in the embodiment are merely examples of the most suitable effects produced by the present invention. Thus, the effects of the present invention are not limited to the effects described in the embodiment.

In the above-described embodiment, the description has been made for the case where the electronic module is applied to an image pickup apparatus, such as a digital camera, which is an electronic apparatus. However, the present disclosure is not limited to this. For example, the electronic module may be applied to other electronic apparatuses, such as mobile apparatuses, car-mounted apparatuses, and image-forming apparatuses. Examples of the image-forming apparatuses include printers, copying machines, facsimiles, and multifunction products that have these functions.

As described above, the above-described embodiment enables the circuit to operate stably.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-62669, filed Apr. 1, 2021, which is hereby incorporated by reference herein in its entirety.

What is claimed is:

1. An electric circuit comprising:
   a first power-supply line;
   a second power-supply line;
   a ground line;
   a first circuit including a first capacitance component having a first capacitance, the first circuit being configured to be electrically connected to the first power-supply line via a first power-supply terminal and electrically connected to the ground line via a first ground terminal;

a second circuit including a second capacitance component having a second capacitance smaller than the first capacitance, the second circuit being configured to be electrically connected to the second power-supply line via a second power-supply terminal and electrically connected to the ground line via a second ground terminal;

a capacitor disposed between the second power-supply terminal and the second ground terminal; and a noise filter disposed between the first power-supply line and the second power-supply line.

2. The electric circuit according to claim 1, further comprising a power supply device configured to apply a direct-current voltage between the second power-supply line and the ground line, wherein the first power-supply terminal is applied with a power supply potential by the power supply device, via the second power-supply line, the noise filter, and the first power-supply line.

3. The electric circuit according to claim 1, wherein the first circuit includes a first circuit element configured to transmit a first digital signal, and wherein the second circuit includes a second circuit element configured to transmit a second digital signal.

4. The electric circuit according to claim 3, wherein a transmission rate of the first digital signal is higher than a transmission rate of the second digital signal.

5. The electric circuit according to claim 3, wherein a voltage amplitude of the first digital signal is smaller than a voltage amplitude of the second digital signal.

6. The electric circuit according to claim 1, wherein the first circuit and the second circuit are included in an identical semiconductor device.

7. The electric circuit according to claim 1, further comprising an RC series circuit disposed between the first power-supply terminal and the first ground terminal.

8. The electric circuit according to claim 7, wherein the RC series circuit includes at least one resistor and at least one capacitor.

9. The electric circuit according to claim 1, wherein the noise filter is a low pass filter.

10. The electric circuit according to claim 9, wherein the low pass filter is a ferrite bead.

11. An electronic apparatus comprising:
a housing; and
the electric circuit according to claim 1 and disposed in the housing.

12. An electric circuit comprising:
a first power-supply line;
a second power-supply line;
a ground line;
a first circuit including a first circuit element configured to transmit a first digital signal, the first circuit being configured to be electrically connected to the first power-supply line via a first power-supply terminal and electrically connected to the ground line via a first ground terminal;

a second circuit including a second circuit element configured to transmit a second digital signal whose transmission rate is lower than a transmission rate of the first digital signal, the second circuit being configured to be electrically connected to the second power-supply line via a second power-supply terminal and electrically connected to the ground line via a second ground terminal;

a capacitor disposed between the second power-supply terminal and the second ground terminal; and a noise filter disposed between the first power-supply line and the second power-supply line.

13. The electric circuit according to claim 12, further comprising a power supply device configured to apply a direct-current voltage between the second power-supply line and the ground line, wherein the first power-supply terminal is applied with a power supply potential by the power supply device, via the second power-supply line, the noise filter, and the first power-supply line.

14. The electric circuit according to claim 12, further comprising an RC series circuit disposed between the first power-supply terminal and the first ground terminal.

15. An electronic apparatus comprising:
a housing; and
the electric circuit according to claim 12 and disposed in the housing.

* * * * *